United States Patent
Eith et al.

[11] Patent Number: 5,810,330
[45] Date of Patent: Sep. 22, 1998

[54] MAGNETIC VALVE FOR A TRACTION-CONTROLLED HYDRAULIC BRAKE SYSTEM FOR MOTOR VEHICLES

[75] Inventors: Hubert Eith; Helmut Staib, both of Schwieberdingen; Michael Friedow, Tamm; Martin Scheffel, Vaihingen; Juergen Lander, Stuttgart; Gerhard Stokmaier, Markgroeningen, all of Germany

[73] Assignee: Robert Bosch GmbH, Stuttgart, Germany

[21] Appl. No.: 701,613

[22] Filed: Aug. 22, 1996

[30] Foreign Application Priority Data

Aug. 23, 1995 [DE] Germany ............... 195 30 899.9

[51] Int. Cl.$^6$ .................................. F16K 31/02
[52] U.S. Cl. ................. 251/129.19; 303/119.2; 137/630; 251/129.14
[58] Field of Search ............... 251/129.15, 52, 251/129.07, 129.14, 129.19; 303/119.2; 137/630.14, 630

[56] References Cited

U.S. PATENT DOCUMENTS

| | | |
|---|---|---|
| 2,869,584 | 1/1959 | Gordon ............... 137/630 |
| 4,782,862 | 11/1988 | Nguyen . |
| 4,844,119 | 7/1989 | Martinic ............... 251/129.14 |
| 4,922,966 | 5/1990 | Kaes et al. ............... 251/129.19 |
| 5,167,442 | 12/1992 | Alaze et al. ............... 303/119.2 |
| 5,172,722 | 12/1992 | Nishimura ............... 137/630 |
| 5,335,984 | 8/1994 | Alaze et al. ............... 303/119.2 |
| 5,425,575 | 6/1995 | Schmidt et al. ............... 303/119.2 |

FOREIGN PATENT DOCUMENTS

| | | |
|---|---|---|
| 0 196 273 | 10/1986 | European Pat. Off. . |
| 0 263 346 | 4/1988 | European Pat. Off. . |
| 0 418 502 | 3/1991 | European Pat. Off. . |
| 4041506 | 6/1992 | Germany . |
| 93 15 336.8 | 1/1994 | Germany . |
| 4236505 | 5/1994 | Germany . |
| 9204214 | 3/1992 | WIPO . |
| 9315941 | 8/1993 | WIPO . |
| 9408831 | 4/1994 | WIPO . |

*Primary Examiner*—Denise L. Ferensic
*Assistant Examiner*—John Ball
*Attorney, Agent, or Firm*—Edwin E. Greigg; Ronald E. Greigg

[57] ABSTRACT

A magnetic valve that switches at high differential pressures and furnishes a large flow cross section. The magnetic valve has an armature, which when current is supplied to a coil is movable toward a pole core counter to the force of a restoring spring. The armature is capable of opening an auxiliary valve of small sealing diameter directly and a main valve of large sealing diameter indirectly. The auxiliary valve and the main valve have a common closing body, which is movable relative to the armature with a limited stroke. The auxiliary valve communicates through a bore of the closing body with the outflow side of the magnetic valve. In the open position of the magnetic valve, the closing body is held in a position that blocks the auxiliary valve by the action of the second restoring spring. The magnetic valve is suitable in particular for slip-controlled hydraulic brake systems of motor vehicles.

20 Claims, 6 Drawing Sheets

MAGNETIC VALVE FOR A TRACTION-CONTROLLED HYDRAULIC BRAKE SYSTEM FOR MOTOR VEHICLES

BACKGROUND OF THE INVENTION

The invention is based on a magnetic valve for a slip-controlled hydraulic brake system for motor vehicles as defined hereinafter.

A magnetic valve of this type is already known (U.S. Pat. No. 4,782,862), in which the main valve and the auxiliary valve assume their closing position when the electromagnet has current supplied to it. When the current supply is shutoff, the armature is initially lifted by the action of a prestressed restoring spring and the auxiliary valve is opened, while the main valve still remains closed. Liquid can now flow from the inflow side of the valve to the outflow side through throttle bores of the valve closing body and can reduce the differential pressure exerted on the closing body. In the further course of the motion of the armature, the armature engages a stop of the bolt that is supported longitudinally displaceably in the armature and is firmly connected to the closing body that is common to both the main valve and the auxiliary valve. Now, when the restoring spring partially relaxes, the armature lifts the closing body, which because of the reduced differential pressure is loaded with a reduced hydraulic closing force, from the main valve seat and uncovers the flow cross section of the magnetic valve. A disadvantage of this known embodiment, however, is that the armature must furnish a relatively long stroke that nevertheless only partly contributes to the opening stroke of the closing body. At high differential pressures, the danger is that the restoring spring cannot exert adequate force to open the main valve, or that the opening will occur in delayed fashion because of the requisite pressure reduction.

OBJECT AND SUMMARY OF THE INVENTION

The magnetic valve of the invention has the advantage over the prior art that the closing body, after the main valve opens, assumes its outset position under spring actuation. That is, the opening stroke of the main valve equals the full working stroke of the armature. Moreover, the opening of the magnetic valve that takes place when current is supplied to the electromagnet is achieved with reliable function because the relatively slight magnetic force at the onset of the armature stroke, when there is a large working air gap between the armature and the pole core, is utilized for opening the auxiliary valve loaded with a low hydraulic closing force, while conversely, the hydraulically higher-loaded main valve is reliably opened in the second portion of the stroke with the magnetic force, which increases over the course of the armature stroke.

Advantageous further features of and improvements to the magnetic valve are possible with the provisions recited herein.

The embodiments of the magnetic valve of the invention disclosed herein are distinguished by a simple design with only relatively few individual parts.

With a further feature of the invention defined herein, it is possible to reduce the radial installation space for the auxiliary valve.

The improvement to the invention defined herein makes it possible in a simple way to adjust the stroke of the auxiliary valve by means of a suitable choice of the depth to which the sleeve is press-fitted onto or into the armature.

With further provision recited herein, opening of the auxiliary valve with little delay is attained.

The embodiments of the magnetic valve of the invention recited herein show variants of the auxiliary valve, in which the armature, which is normally of soft magnetic iron and therefore can withstand only slight loads because of its strength, suitably has a preferably hardened ball as an auxiliary closing piece, while the closing body that is not part of the magnetic circuit of the magnetic valve can comprise a material that is suitable for the demand made on it.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
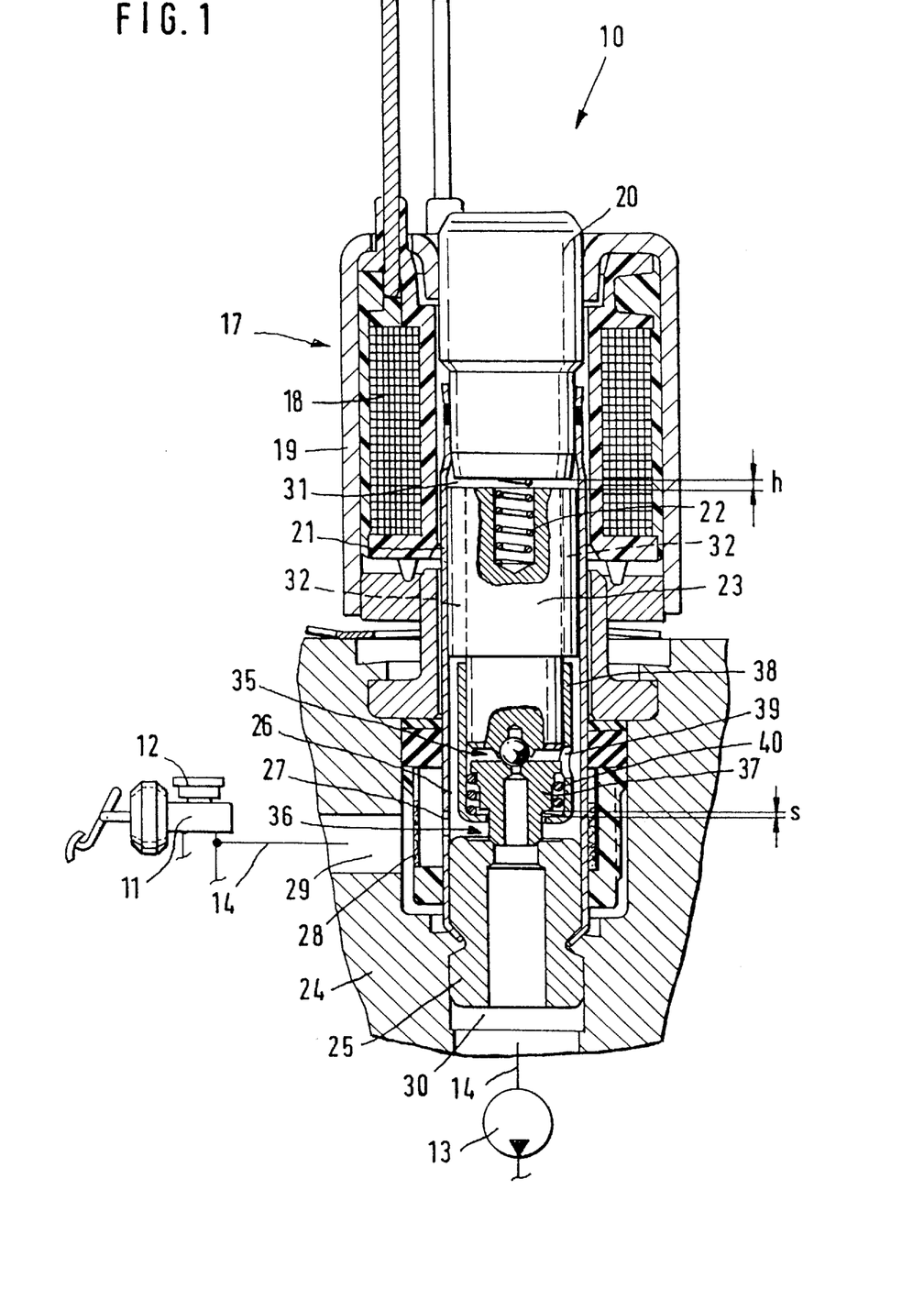
FIG. 1 in longitudinal section shows a magnetic valve with a directly armature-actuated auxiliary valve and a main valve pilot-controlled by the auxiliary valve, and FIGS. 2–11, on a different scale from FIG. 1, show a detail of the magnetic valve of FIG. 1 with variants of the auxiliary valve and main valve with one closing body.

The first exemplary embodiment shown in FIG. 1 shows a magnetic valve 10 for use in a traction-controlled hydraulic brake system for motor vehicles, of which in the drawing only a master cylinder 11 with a supply tank 12 for pressure fluid and a high-pressure pump 13 are shown. One such brake system is shown in German Patent Application DE 44 41 791 A1, which was not published prior to the priority date of the present application. It is designed not only for anti-lock braking but also for traction control, as well as for automatic braking for the sake of lateral-slip control (drive dynamics control) and to reinforce driver-actuated braking (brake assistant). It is therefore an essential demand of the magnetic valve 10 of the invention, which is located in an intake line 14 extending between the master cylinder 11 and the pump 13, is to open even counter to a brake pressure generated by the master cylinder 11 and to uncover a relatively large flow cross section, so that the pump 13 can pump an adequately large volumetric stream, to the brake system even at low temperatures, in particular.

The magnetic valve 10 has an electromagnet 17, which substantially comprises a coil 18, a housing jacket 19, and a pole core 20. The pole core 20 is tightly welded to a guide sleeve 21 for an armature 23 that is longitudinally movable toward the pole core counter to the force of a prestressed restoring spring 22. On its other end, the guide sleeve 21 engaging a valve block 24 is tightly joined to a valve body 25. Between the armature 23 and the valve body 25, a first valve chamber 26 is formed in the guide sleeve 21; through both an opening 27 in the guide sleeve and a filter 28, this valve chamber communicates unthrottled with the inflow side 29 of the magnetic valve 10. The aforementioned intake line 14 leads from the inflow side 29 to the master cylinder 11. The outflow side 30 of the magnetic valve 10 is located on the outlet side of the valve body 25, which has a longitudinal hole drilled through it. The outflow side 30 communicates through the intake line 14 with the intake side of the pump 13. In addition to the first valve chamber 26, the magnetic valve 10 has a second valve chamber 31, formed between the pole core 20 and the armature 23. The two valve chambers 26 and 31 communicate with one another through longitudinal grooves 32 of the armature 23. The armature 23 is accordingly bathed by pressure fluid.

The magnetic valve 10 switches the passage between the inflow side 29 and the outflow side 30 with an auxiliary valve 35 and a main valve 36. The auxiliary valve 35 and the main valve 36 are seat valves with a common closing body 37. This closing body is received longitudinally movably in a sleeve 38 that is secured to the armature 23. Through a lateral opening 39 in the sleeve 38, located in the region of the auxiliary valve 35, the interior of the sleeve communicates with the first valve chamber 26. Located in the sleeve 38 is a second restoring spring 40, embodied as a helical compression spring, with which initial tension engages the closing body 37 on the one side and the sleeve 38 on the other. In the blocking position, shown, of the magnetic valve 10 without current, the auxiliary valve 35 having a relatively small valve cross section and the main valve 36 equipped with by comparison a large valve cross section are closed. The closing body 37 is capable of executing a stroke s, which is shorter than the armature stroke h. The structural design of the auxiliary valve 35, main valve 36 and closing body 37 will be described below in terms of the variants of the magnetic valve 10 shown in FIGS. 2–11.

Figure 2:
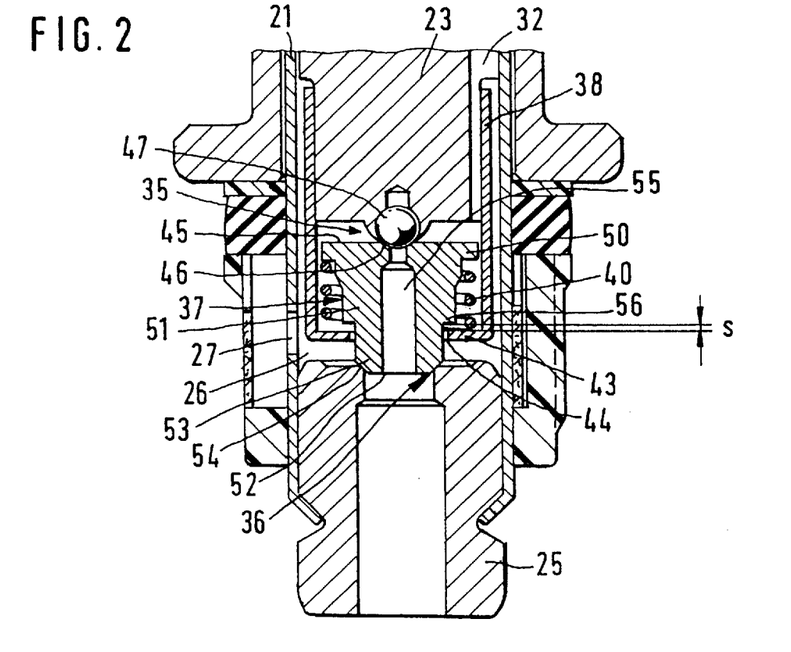

The sleeve 38 received coaxially and circumferentially on the armature 23 has a bottom wall 43, toward the valve chamber, with a central circular aperture 44 (FIG. 2). The closing body 37 located in the sleeve 38 is embodied substantially as a cylindrical part. On its face end 45 toward the pole core, it has a hollow conical auxiliary valve seat 46. Cooperating with the auxiliary valve seat 46 is an auxiliary closing piece 47, in the form of a hardened steel ball caulked to the armature 23. The auxiliary valve seat 46 and the auxiliary closing piece 47 form the auxiliary valve 35. The longitudinal groove 32 of the armature 23 that toward the auxiliary valve opens into the opening-free sleeve forms a pressure-fluid-carrying connection with the first valve chamber 26.

The second restoring spring 40 enveloping the closing body 37 is supported by one end on the bottom wall 43 of the sleeve 38. By its other end, the restoring spring 40 engages a collar 50, which is embodied to encompass the circumference in the region of the face end 45 toward the pole core of the closing body 37. The closing body 37 is guided in the sleeve 38 by the collar 50. A shaft 51 that also performs guiding tasks reaches through the aperture 44 in the bottom wall 43 of the sleeve 38. In the region of the second face end 52 of the closing body 37, remote from the pole core, the shaft 51 is embodied as a spherical-zone-like main closing piece 53 of the main valve 36. The main closing piece 53 cooperates with a hollow conical main valve seat 54 on the valve body 25. The closing body 37 is provided with a coaxially continuous bore 55, that discharges into the auxiliary valve seat 46, so that the auxiliary valve 35 communicates through it directly with the outflow side 30 of the magnetic valve 10. Finally, a shoulder 56 is also formed on the shaft 51 of the closing body 37, and by it the closing body cooperates, for stroke limitation, with the bottom wall 43, forming a stop, of the sleeve 38.

The mode of operation of the magnetic valve 10 is as follows:

Current supplied to the coil 18 switches the magnetic valve 10 over from the blocking position, shown, into the open position, in which the inflow side 29 communicates with the outflow side 30 through the opened seat valve 36. The magnetic force exerted on the armature 23 upon the switchover is at its lowest value at the beginning of the armature stroke. Once the working air gap has been overcome, or in other words, once the armature 23 engages the pole core 20, the magnetic force attains its highest value.

When there is a pressure equilibrium on the inflow side 28 and the outflow side 29 of the magnetic valve, no hydraulic closing forces are operative upon the armature 23 and the closing body 36. To open the magnetic valve 10, the magnetic force therefore needs to overcome only the biasing force of the restoring spring 22. Only the main valve 36 is opened; the auxiliary valve 35 remains in its closing position during the armature stroke.

Conversely, if a higher pressure prevails on the inflow side 29 than on the outflow side 30 when the magnetic valve 10 is closed, or in other words as a result of actuation of the master cylinder 11, then the armature 23 and the closing body 37 are not in pressure equilibrium; hydraulic closing forces are operative upon both the armature and the closing body. The closing force at the armature 23 is dependent on the sealing area of the auxiliary valve 35; the closing force on the closing body 37 is dependent on the sealing area of the main valve 36, minus the sealing area of the auxiliary valve 35. The hydraulic closing force exerted in the closing body 37 is considerably greater, because of the large cross section of the main valve 36, than the closing force exerted on the armature 23.

If the pressure difference at the magnetic valve 10 is slight, and if the closing force acting on the closing body 37 is below the prestressing force of the second restoring spring 40, then as described above, when current is supplied to the coil 18, the main valve 36 is opened without relative motion of the closing body 37 relative to the armature 23. When the pressure differences between the inflow side 29 and the outflow side 30 of the magnetic valve 10 are high, then the hydraulic closing force acting on the closing body 37 is greater than the prestressing force of the restoring spring 40. The magnetic force, which is low at the beginning of the armature stroke h, must therefore, upon the motion of the armature 23 toward the pole core 20, overcome the prestressing force of the first restoring spring 22 and the restoring spring 40 as well as the hydraulic closing force acting on the armature, in order to open the auxiliary valve 35. By means of the auxiliary valve 35 that opens over the further course of armature motion, pressure fluid now flows through the bore 55 of the closing body 37 to the outflow side 30; the consequence is a lessening of the pressure difference and a reduction in the closing force acting upon the closing body 37. If the closing force drops to a value below the force of the second restoring spring 40, then it is capable of opening the main valve 36. However, if the hydraulic closing force is still high enough that the closing body 37 maintains its position and keeps the main valve 36 closed, then over the further course of the armature motion, at a closing body stroke s=0, the bottom wall 43 of the sleeve 38 strikes the shoulder 57 on the shaft 51 of the closing body 37. The considerably greater magnetic force during this phase of the armature motion, together with the inertia of the armature 23, is capable of lifting the closing body 37 from the valve body 25 and opening the main valve 36. The force stored in the second restoring spring 40 moves the now largely pressure-equalized closing body 37 toward the armature 23, until the closing position of the auxiliary valve 35 is attained. At the end of the armature opening stroke, or in other words when the armature 23 engages the pole core 20, the main valve 36 assumes its largest possible flow cross section, and the auxiliary valve 35 assumes its position that blocks the bore 55 in the closing body 37.

When there are major pressure differences between the inflow side 29 and the outflow side 30 of the magnetic valve 10, the auxiliary valve 35 is thus opened immediately at the onset of the working stroke h of the armature 23, while the opening of the main valve 36 takes place indirectly, after a stroke s traversed by the armature. The closing body stroke s can be dimensioned by suitably adjusting the depth to which the sleeve 38 is press-fitted onto the armature 23. To attain reliable opening of the main valve 36 even when there are very major pressure differences at the magnetic valve 10, the closing body stroke s can be adjusted to virtually the value of the armature stroke h. With such a setting, the magnetic force, reduced by the force of the two restoring springs 22 and 40, is used near its maximum value to open the main valve 36.

In the ensuing description of the further exemplary embodiments, only differences from the exemplary embodiments already described are mentioned. If any characteristics shown in the drawing are not mentioned below, then they are the same as the characteristics of the exemplary embodiment of FIGS. 1 and 2.

Figure 3:
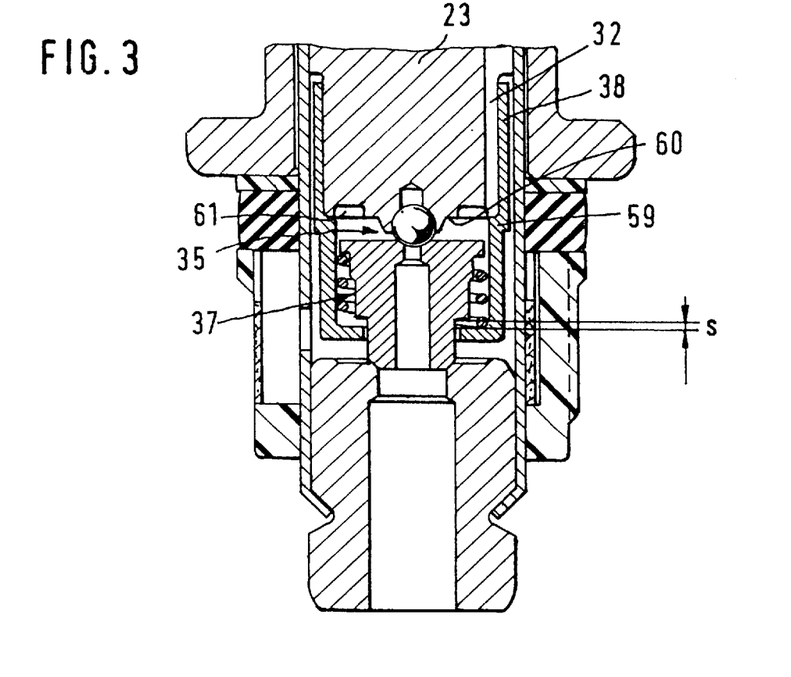

The exemplary embodiment of the magnetic valve 10 of FIG. 3 differs from the preceding one in that the sleeve 38 has a shoulder 59, which by taking its seat on the face end 60 of the armature 23 remote from the pole core defines the stroke s of the closing body 37 relative to the armature. A concentrically extending annular groove 61 is also formed on the face end 60 of the armature 23; the longitudinal groove 32 of the armature is met by this groove 61, creating a pressure-fluid-carrying connection with the auxiliary valve 35.

Figure 4:
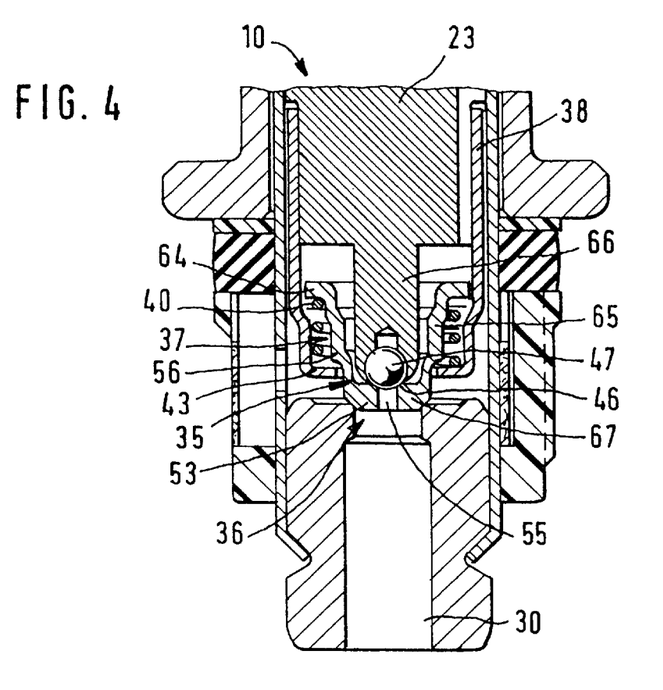

The exemplary embodiment shown in FIG. 4 shows an armature 23 with a sleeve 38 press-fitted coaxially onto the outside, in which sleeve a closing body 37 embodied substantially as a cup-shaped reformed sheet-metal part is received in a longitudinally movable manner. Toward the pole core, the closing body 37 has a radially outward-protruding edge 64 for engagement by the second restoring spring 40. A jacket wall 65 of the closing body 37 that originates at the edge 64 is shaped as a tubular shaft, which is engaged by the armature 23 with a ball, as an auxiliary closing piece 47, held on a tappetlike extension 66. The jacket wall 65 changes over toward the valve body into a bottom wall 67, which is embodied on the inside as an auxiliary valve seat 46 and on the outside as a main closing piece 53 of the main valve 36. The bottom wall 67 is also provided with the bore 55, through which the auxiliary valve 35 communicates with the outflow side 30 of the magnetic valve 10. The shoulder 56 that in cooperation with the bottom wall 43 of the sleeve 38 acts to limit the stroke of the closing body is also embodied on the jacket wall 65 of the closing body 37. The second restoring spring 40 is moreover supported on the bottom wall 43 of the sleeve through which the closing body 37 reaches. Otherwise, the exemplary embodiment of FIG. 4 is largely equivalent to that of FIG. 2.

Figure 5:
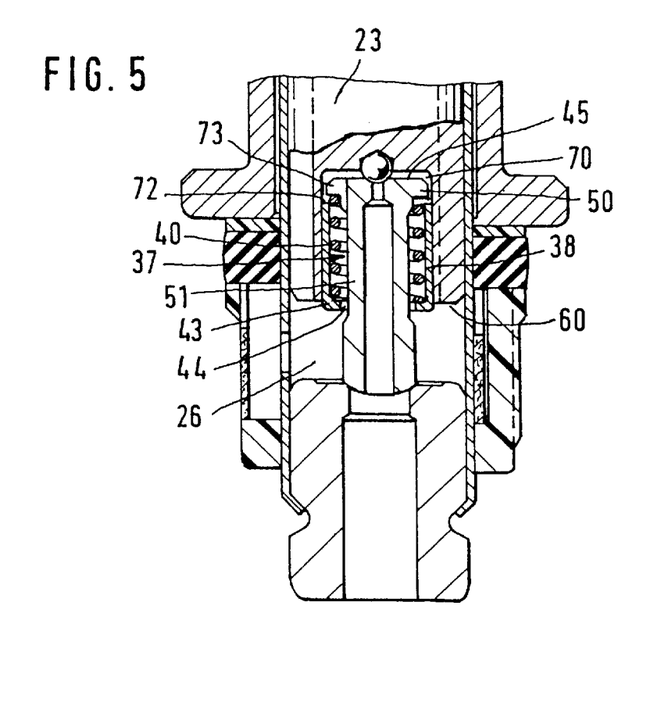

In the exemplary embodiment of FIG. 5, the armature 23 is provided with a coaxially extending blind bore 70 beginning at its face end 60 remote from the pole core. A sleeve 38 of smaller diameter than in the preceding exemplary embodiments is press-fitted into the bore 70. The sleeve 38 has a bottom wall 43 extending on the output side of the bore 70, with an aperture 44 for the closing body 37. The closing body 37, embodied substantially as a cylindrical part, is relatively slender and with its shaft 51 reaches through the aperture 44 in the bottom wall 43 of the sleeve 38. In the region of the face end 45 toward the pole core, the closing body 37 is provided with the encompassing collar 50, which is engaged by the second restoring spring 40 supported on the bottom wall 43 of the sleeve 38. The sleeve 38, with its face end 72 toward the bottom of the bore, forms the stroke-limiting stop for the collar 50 of the closing body 37. The region toward the auxiliary valve of the blind bore 70 communicates with the first valve chamber 26 through at least one groove 73 in the collar 50 of the closing body 37 and through the aperture 44 of the sleeve 38.

Figure 6:
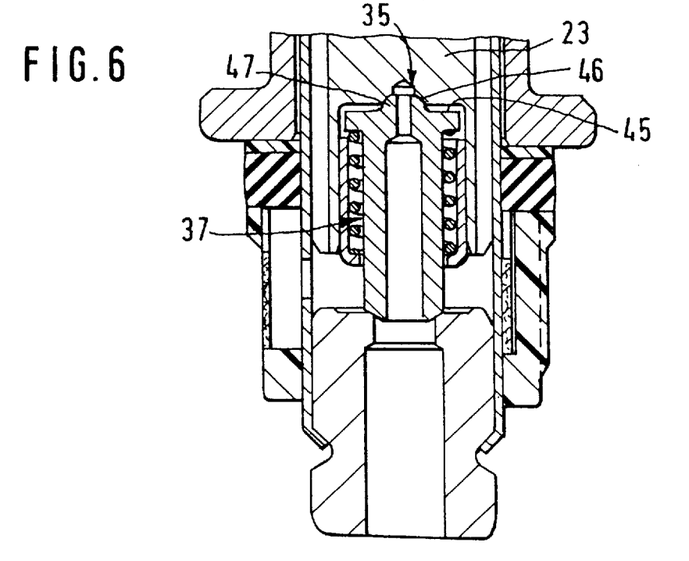

The closing body 37 of the exemplary embodiment of FIG. 6 is embodied largely equivalent to that of FIG. 5. However, one essential difference is that the auxiliary closing piece 47 is embodied as a hemispherically raised portion of the face end 45 toward the pole core of the closing body 37, and the auxiliary valve seat 46 of the auxiliary valve 35 is formed into the armature 23 on the bore bottom.

Figure 7:
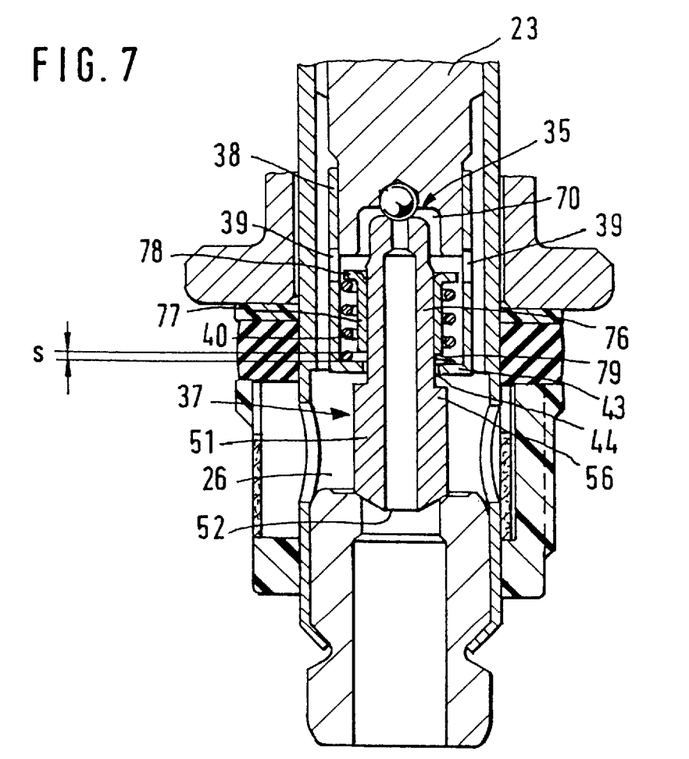

The exemplary embodiment shown in FIG. 7 has a sleeve 38 press-fitted to the outside of the armature 23, and a closing body 37, embodied essentially as a cylindrical part, whose shaft 51, after a shoulder 56, is embodied with an enlarged diameter toward the face end 52 remote from the pole core. A portion 76 of the shaft 51 having a smaller diameter extends through the aperture 44 in the bottom wall 43 of the sleeve, into the interior thereof and on into the blind bore 70 of the armature 23. The auxiliary valve 35 is provided there, as in FIG. 5. A bushing 77 is press-fitted onto the smaller-diameter portion 76 of the closing body shaft 51; toward the pole core, it has a circumferentially encompassing collar 78 for the engagement of the second restoring spring 40. As in all the exemplary embodiments described so far, the restoring spring 40 is supported on the bottom wall 43 of the sleeve 38. The relative motion of the closing body 37 with respect to the armature 23 is limited, by the impact of the face end 79 of the bushing 77 remote from the collar 78 on the bottom wall 43 of the sleeve 38, to a stroke s that is shorter than the armature stroke h. Moreover, lateral openings in the sleeve 38 are provided, through which the region toward the auxiliary valve of the armature 23 communicates with the valve chamber 26.

Figure 8:
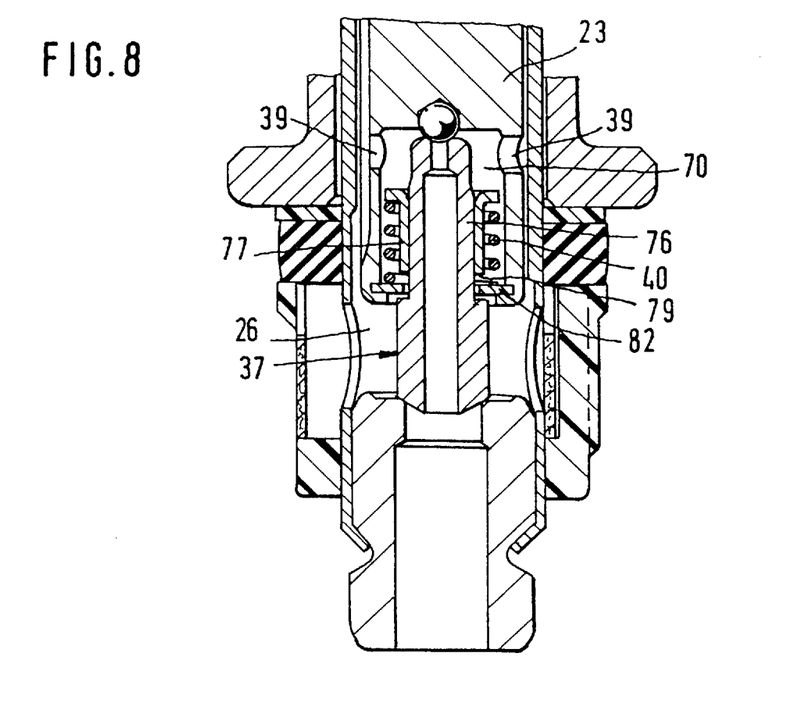

In the exemplary embodiment of FIG. 8, the closing body 37 with the bushing 77 is embodied as identical in form to those parts in the exemplary embodiment of FIG. 7. The essential distinction is that the smaller-diameter portion 76 of the closing body 37, with the bushing 77 press-fitted onto it, engages the blind bore 70 of the armature 23, with the omission of the sleeve 33. The blind bore 70 is terminated on the opening side by a circular-annular disk 82 through which the closing body portion 76 extends. The disks 82, crimped onto the armature 23, replaces the bottom wall 43 of the sleeve 38 of FIG. 7. The second restoring spring 40 is therefore supported on the disk 82; this disk also acts as a stroke-limiting stop for the face end 79 of the bushing 77. The region toward the auxiliary valve of the blind bore 70 communicates with the valve chamber 26 through lateral openings 39 of the armature 23.

Figure 9:
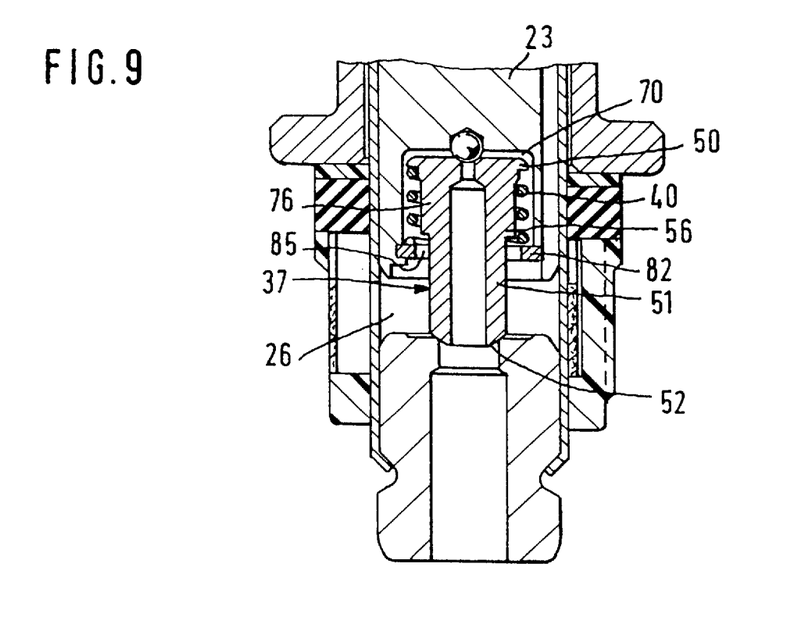

The closing body 37 of the exemplary embodiment of FIG. 9 is shaped in a manner that substantially agrees with that of FIGS. 1–3 in terms of both the collar 50 and the shoulder 56 on the shaft 51. However, as in the exemplary embodiment of FIG. 8, the portion 76 toward the pole core of the closing body shaft 51 is received in the blind bore 70 of the armature 23. On the opening side, the bore 70 is terminated by the circular-annular disk 82 caulked into the armature 23. The disk 82, in cooperation with the shoulder 56, has a stroke-limiting function for the closing body 37. The second restoring spring 40 is also supported on the disk 82. For connecting the blind bore 70 to the valve chamber 26 in a pressure-fluid-carrying way, at least one recess 85 is provided in the disk 82.

Figure 10:
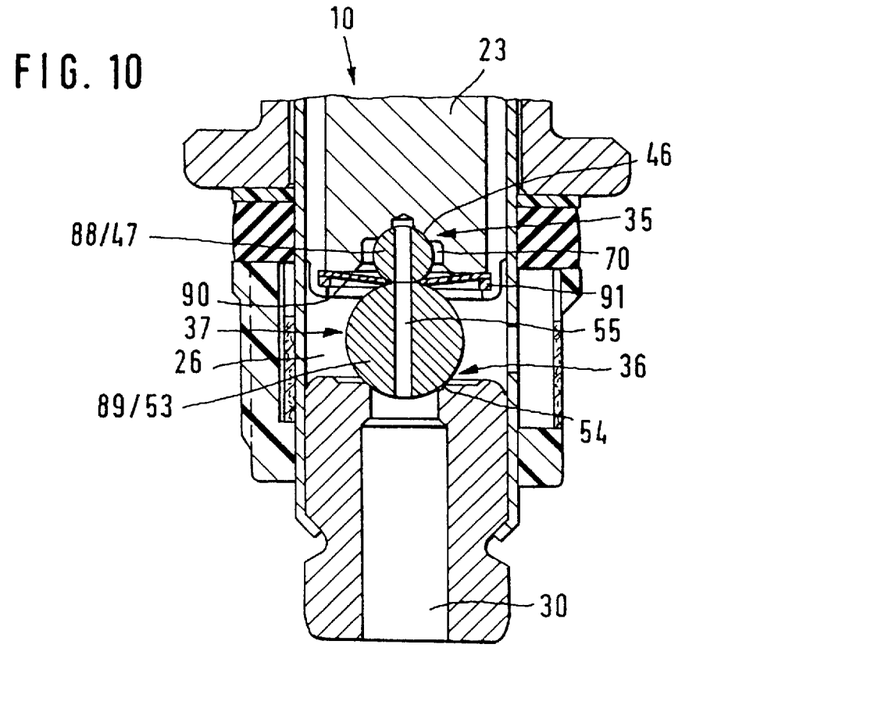

The exemplary embodiment of FIG. 10 shows a closing body 37 which comprises two balls 88, 89 of different diameter which are secured together by being welded soldered or the like. The smaller-diameter ball 88 forms the auxiliary closing piece 47 of the auxiliary valve 35, whose auxiliary valve seat 47 is disposed in a blind bore 70 of the armature 23. The larger-diameter ball 89 forms the main closing piece 53 of the main valve 36, which cooperates with the main valve seat 54. By means of the bore 55 which passes through both balls 88, 89 of the closing body 37, the auxiliary valve 35 communicates with the outflow side 30 of the magnetic valve 10. The constriction between the two balls 88 and 89 where the balls meet is engaged by a washerlike spring 90, which is secured by its outer edge to a retaining ring 91 crimped to the armature 23. A prestressing force exerted on the washerlike spring 90 exerts a closing force on the auxiliary closing piece 49 of the auxiliary valve 35. Apertures, not shown, in the spring 90 furnish a pressure-fluid-carrying connection between the auxiliary valve 35 and the valve chamber 26.

Figure 11:
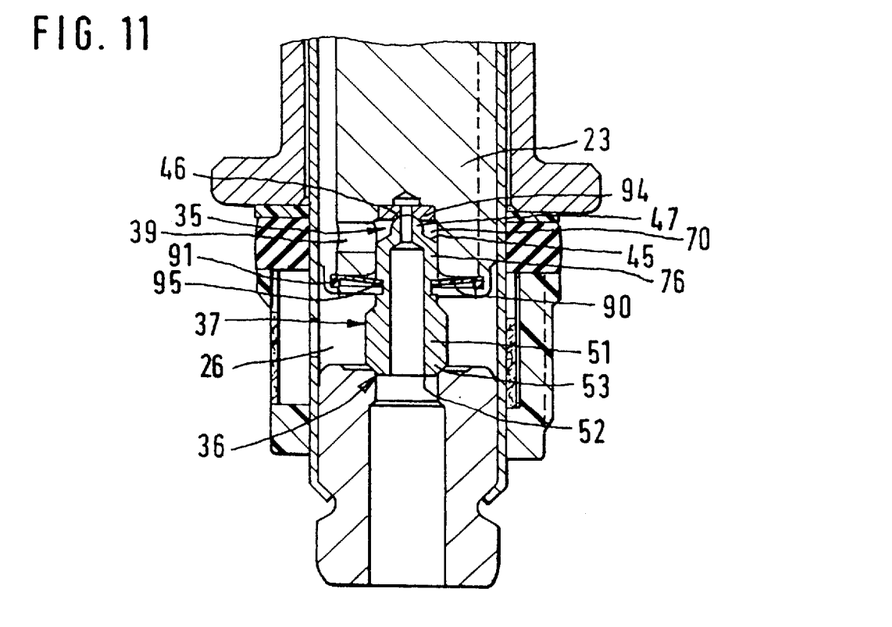

The closing body 37 of the exemplary embodiment of FIG. 11 is embodied essentially as a cylindrical part, which in a way that corresponds with the exemplary embodiment of FIG. 6 has the auxiliary closing piece 47 of the auxiliary valve 35 on its face end 45 toward the pole core, and the main closing piece 53 of the main valve 36 on its face end 52 remote from the pole core. The auxiliary valve seat 46 of the auxiliary valve 35 is located on a disk 94, which is received in the bore 70 of the armature 23. As in the majority of exemplary embodiments described thus far, the auxiliary closing piece 47 may, however, also be provided on the armature 23 and the auxiliary valve seat 46 on the closing body 37. The shaft 51 of the closing body 37, extending between the two face ends 45 and 52, is received by its portion 76 toward the pole core in the bore 70 of the armature 23. A circumferential groove 95 of the shaft 51 is engaged by a washerlike spring 90, which just as in the exemplary embodiment of FIG. 10 is secured by its outer edge, with a retaining ring 91, to the armature 23 and exerts a closing force on the auxiliary valve 35. A lateral opening 39 of the armature 23 furnishes the communication of the auxiliary valve 35 with the valve chamber 26.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic control valve (10) for a brake system for a vehicle, the control valve is disposed in a brake fluid intake line (14) that extends between a master cylinder (11) and an intake side of a pump (13), of a slip-controlled hydraulic brake system for motor vehicles, comprising:

a housing;

an armature (23) that is longitudinally movable in a bore in said housing toward a pole core (20) counter to a force of a first restoring spring (22) by an electromagnet (17);

an auxiliary valve (35), which comprises an auxiliary closing piece (47) and an auxiliary valve seat (46) of a small sealing diameter, is actuatable directly by the armature (23);

a main valve (36), which has a main closing piece (53) and a main valve seat (54) of large sealing diameter, is actuatable indirectly by the armature (23);

the auxiliary valve (35) and the main valve (36) are disposed in a valve chamber (26), which communicates unthrottled with an inflow side (29) of the magnetic valve (10);

the auxiliary valve (35) and the main valve (36) have a common closing body (37) which is movable with a limited stroke relative to the armature (23);

the auxiliary valve (35) communicates with an outflow side (30) of the magnetic valve (10) through at least one bore (55) that passes through the closing body (37), and the main valve (36) communicates with the outflow side (30) directly;

the magnetic valve (10) when supplied with current assumes an open position, in which the closing body (37) is held, by a force of a second restoring spring (40) at least indirectly engaging the armature (23), in its position blocking the auxiliary valve (35).

2. The magnetic valve in accordance with claim 1, in which:

a sleeve (38) that guides the closing body (37) is coaxially received on the armature (23), a chamber-side bottom wall (43) is pierced by the closing body (37) and forms a support face for one end of the second restoring spring (40) embodied as a helical compression spring;

the closing body (37), embodied essentially as a cylindrical part, has the auxiliary valve seat (46) or the auxiliary closing piece (47) of the auxiliary valve (35) on a face end (45) toward the pole core;

in the region of the face end (45) toward the pole core, a circumferentially encompassing collar (50) is provided for an engagement of another end of the second restoring spring (40) with prestressing;

the closing body (37) has a shaft (51), guided in the bottom wall (43), which is embodied in a region of the second face end (52), remote from the pole core, as the main closing piece (53) of the main valve (36);

a relative motion of the closing body (37) with respect to the armature (23) is limited by a stop to a stroke (s) that is shorter than an armature stroke (h).

3. A magnetic valve in accordance with claim 1, in which:

a sleeve (38) that guides the closing body (37) is coaxially received on the armature (23), its chamber-side bottom wall (43) is pierced by the closing body (37) and forms a support face for one end of the second restoring spring (40) embodied as a helical compression spring;

the closing body (37), embodied essentially as a cup-shaped reformed sheet-metal part, has toward the pole core a radially outward-producing edge (64) for engagement of another end of the restoring spring (40) with prestressing;

a bottom wall (67) of the closing body (37) is embodied on an inside as a seat (46) of the auxiliary valve (35) and on an outside as the main closing piece (53) of the main valve (36) is provided with a bore (55);

a jacket wall (56) of the closing body (37) is shaped as a tubular shaft, an inside of said jacket wall is engaged with a ball by said armature, as the auxiliary closing piece (47), held on a tappetlike extension (66);

the relative motion of the closing body (37) with respect to the armature (23) is limited by a stop to a stroke (s) that is shorter than the armature stroke (h).

4. A magnetic valve in accordance with claim 1, in which:

the closing body (37) is embodied essentially as a cylindrical part, which on a face end (45) toward the pole core has the auxiliary valve seat (46) or the auxiliary closing piece (47) of the auxiliary valve (35), and on its face end (52) remote from the pole core has the main closing piece (53) of the main valve (36);

a shaft (51) of the closing body (37), extending between the two face ends (45, 52), is received by a portion (76) toward the pole core in a bore (70) of the armature (23);

in the region of the face end (45) of the closing body toward the pole core, a circumferentially encompassing collar (50) is provided on a shaft (51) for the engagement of one end of the second restoring spring (40) embodied as a helical compression spring;

the shaft (51) of the closing body (37) is reduced in diameter toward the face end (52) remote from the pole core, forming a shoulder (56);

the bore (70) of the armature (23) is terminated with a circular-annular disk (82), on which the second restoring spring (40) is supported by another end with prestressing;

the relative motion of the closing body (37) is limited by an impact of the shoulder (56) on the disk (82) to a stroke (s) that is shorter than the armature stroke (h).

5. A magnetic valve in accordance with claim 1, in which:

the closing body (37) is embodied essentially as a cylindrical part, which on a face end (45) toward the pole core has the auxiliary valve seat (46) or the auxiliary closing piece (47) of the auxiliary valve (35), and on a face end (52) remote from the pole core has the main closing piece (53) of the main valve (36);

a shaft (51) of the closing body (37) which extends between the two face ends (45, 52) is enlarged in diameter, after a shoulder (56), toward the face end (52) remote from the pole core;

onto the smaller-diameter portion (76) of the closing body shaft (51), a bushing (77) is press-fitted, which toward the pole core has a circumferentially encompassing collar (78) for the engagement of the one end of the second restoring spring (40);

the smaller-diameter portion (76) of the closing body shaft (51) extends through a bottom wall (43) of a sleeve (38), received on the armature (23), or through a circular-annular disk (82), with which a bore (70) of the armature (23) that receives the shaft portion (76) is terminated;

another end of the second restoring spring (40) is supported with prestressing on the bottom wall (43) of the sleeve (38) or on the disk (82);

the relative motion of the closing body (37) with respect to the armature (23) is limited, by an impact of the face end (79) of the bushing (77) remote from the collar (78) on the bottom wall (43) of the sleeve (38), or on the disk (82), to a stroke (s) that is shorter than the armature stroke (h).

6. A magnetic valve in accordance with claim 1, in which:

the closing body (37) comprises two axially aligned materially joined balls (88, 89) of different diameter, of which the smaller-diameter ball (88) forms the auxiliary closing piece (47) of the auxiliary valve (35), and the larger-diameter ball (89) forms the main closing piece (53) of the main valve (36);

a washerlike spring (90) engages a constriction between the two joined balls (88, 89), the spring is secured by an outer edge to the armature (23) and exerts a closing force upon the auxiliary closing piece (47) of the auxiliary valve (35).

7. The magnetic valve in accordance with claim 1, in which:

the closing body (37) is embodied essentially as a cylindrical part, which on a face end (45) toward the pole core has the auxiliary valve seat (46) or the auxiliary closing piece (47) of the auxiliary valve (35), and on another face end (52) remote from the pole core has the main closing piece (53) of the main valve (36);

a shaft (51) of the closing body (37), which extends between the two face ends (45, 52), is received by a portion (76) toward the pole core in a bore (70) of the armature (23);

a circumferential groove (95) of the shaft (51) is engaged by a washerlike spring (90), which is secured by an outer edge to the armature (23) and exerts a closing force on the auxiliary valve (35).

8. A magnetic valve in accordance with claim 2, in which the sleeve (38) is press-fitted circumferentially onto the armature (23) and with a bottom wall (43) forms a stop for a shoulder (56) embodied on the shaft (51) of the closing body (37), or that the sleeve (38) is press-fitted into a bore (70) of the armature (23) remote from the pole core and with another face end (72) toward the bore bottom forms a stop for the collar (50) of the closing body (37).

9. A magnetic valve in accordance with claim 3, in which the sleeve (38) is press-fitted circumferentially onto the armature (23) and with a bottom wall (43) forms a stop for a shoulder (56) embodied on the shaft (51) of the closing body (37), or that the sleeve (38) is press-fitted into a bore (70) of the armature (23) remote from the pole core and with another face end (72) toward the bore bottom forms a stop for the collar (50) of the closing body (37).

10. A magnetic valve in accordance with claim 2, in which a region toward the auxiliary valve of the armature (23) communicates at least indirectly with the valve chamber (26) through a lateral opening (39) in either the sleeve (38) or the armature (23).

11. A magnetic valve in accordance with claim 3, in which a region toward the auxiliary valve of the armature (23) communicates at least indirectly with the valve chamber (26) through a lateral opening (39) in either the sleeve (38) or the armature (23).

12. A magnetic valve in accordance with claim 4, in which a region toward the auxiliary valve of the armature (23) communicates at least indirectly with the valve chamber (26) through a lateral opening (39) in either the sleeve (38) or the armature (23).

13. A magnetic valve in accordance with claim 5, in which a region toward the auxiliary valve of the armature (23) communicates at least indirectly with the valve chamber (26) through a lateral opening (39) in either the sleeve (38) or the armature (23).

14. A magnetic valve in accordance with claim 6, in which a region toward the auxiliary valve of the armature (23) communicates at least indirectly with the valve chamber (26) through a lateral opening (39) in either the sleeve (38) or the armature (23).

15. A magnetic valve in accordance with claim 7, in which a region toward the auxiliary valve of the armature (23) communicates at least indirectly with the valve chamber (26) through a lateral opening (39) in either the sleeve (38) or the armature (23).

16. A magnetic valve in accordance with claim 2, in which the auxiliary closing piece (47) of the auxiliary valve (35) is formed at least indirectly on the armature (23), and the auxiliary valve seat (46) is formed on the closing body (37), or vice versa.

17. A magnetic valve in accordance with claim 3, in which the auxiliary closing piece (47) of the auxiliary valve (35) is formed at least indirectly on the armature (23), and the auxiliary valve seat (46) is formed on the closing body (37), or vice versa.

18. A magnetic valve in accordance with claim 4, in which the auxiliary closing piece (47) of the auxiliary valve (35) is formed at least indirectly on the armature (23), and the auxiliary valve seat (46) is formed on the closing body (37), or vice versa.

19. A magnetic valve in accordance with claim 16, in which the auxiliary closing piece (47) is a ball held on the armature (23) and said ball cooperates with the hollow-conical auxiliary valve seat (46) of the closing body (37).

20. A magnetic valve in accordance with claim 16, in which the auxiliary valve seat (46) is embodied on the armature (23), for instance on a disk (94) inserted into the armature, while the closing body (37), on a face end (45) toward the pole core, has an at least approximately hemispherically shaped auxiliary closing piece (47).

* * * * *